July 24, 1934.  F. A. F. CRAWFORD  1,967,551
MANUFACTURE OF ESTERS
Filed May 25, 1932
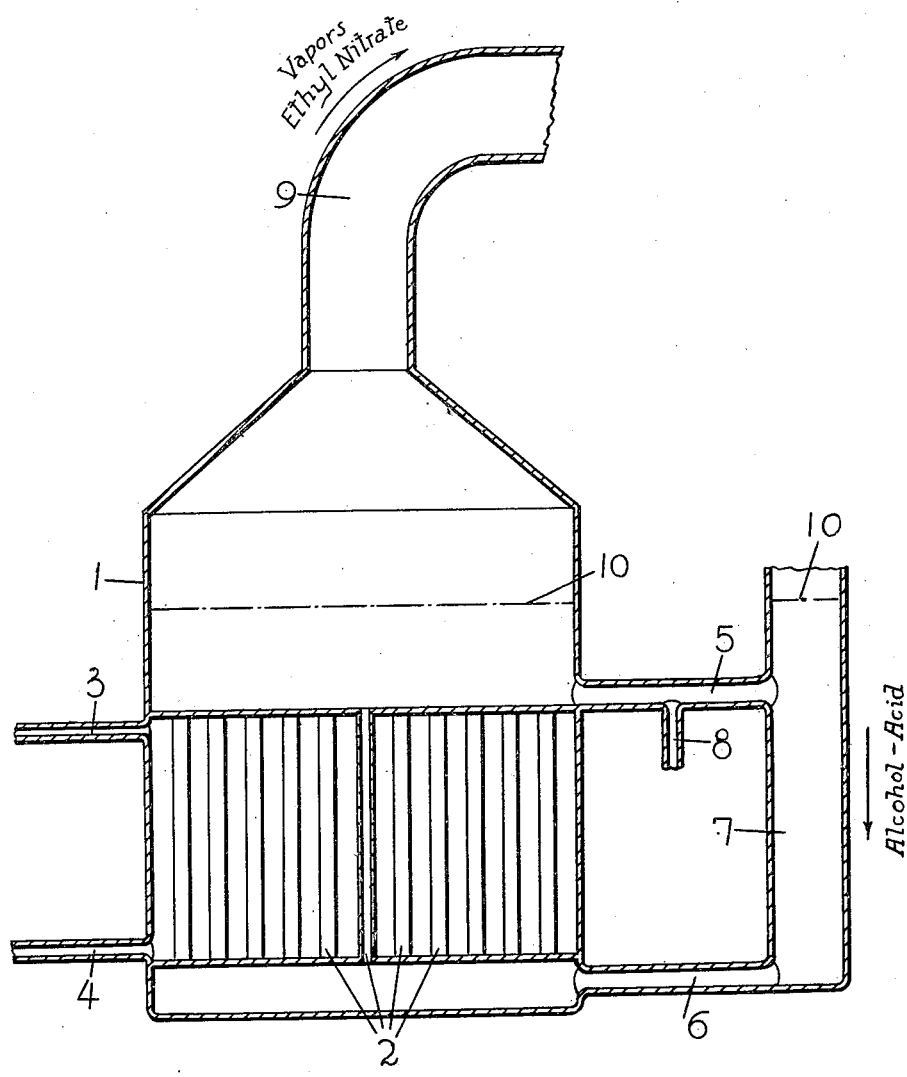
INVENTOR.
Frederick A. F. Crawford
BY
ATTORNEY.

Patented July 24, 1934

1,967,551

UNITED STATES PATENT OFFICE 1,967,551

MANUFACTURE OF ESTERS

Frederick Alexander Ferrier Crawford, Saltcoats, Scotland, assignor to Imperial Chemical Industries Limited, a corporation of Great Britain Application May 25, 1932, Serial No. 613,528
In Great Britain May 26, 1931

5 Claims. (Cl. 260—144)

This invention relates to an improved process and apparatus for the continuous manufacture of esters in the liquid phase, with continuous distillation of the ester and/or the water formed.

The process according to the invention comprises circulating a body of liquid reaction mixture upwardly through a still and downwardly through an external limb connected thereto, applying heat to the contents of the still so as to boil off at least one of the reaction products, i. e. the ester and/or the water formed, and introducing the reactants which are volatile at the reaction temperature, with or without other substances, into the external stream of circulating liquid which is returned to the base of the still. The system is purged if necessary from time to time or continuously to prevent the undue accumulation of reaction products and/or impurities. By volatile reactants are meant those which boil at or below the reaction temperature. The non-volatile reactants may be added either direct to the still, or to the external stream of circulating liquid, and either separately from the volatile reactants or mixed therewith. Preferably a still of the vertical multi-tubular type is employed, with externally steam-heated tubes; the reaction mixture then circulates through the tubes and through the external limb by thermosiphon action, with or without the assistance of a pump.

One form of the invention is illustrated by reference to the accompanying drawings, which is a diagrammatic section of an apparatus suitable for carrying out the above process. The still 1 is fitted with a nest of tubes 2, which are externally heated by steam admitted at 3 and withdrawn at 4. Circulating pipes 5 and 6 connect the still to a limb or vessel 7 of relatively small cross-section. The apparatus is filled to the level shown with the reaction mixture, which circulates by thermo-siphon action through the limb 7 and the tubes 2. The vapours from the still are withdrawn by a pipe leading to a condenser (not shown), and fresh alcohol-acid mixture is added to the system at the top of the vessel 7, in such a manner that it enters the returning stream of reaction mixture, which is carried to the base of the still. A drain-pipe 8 is provided in the circulating pipe 5 in order to purge the system as required. The apparatus may be made of stainless steel or other suitable material resistant to chemical attack.

The above process and apparatus are particularly useful in connection with the manufacture of nitric esters of the lower aliphatic alcohols. Thus, in the manufacture of ethyl nitrate, the reaction mixture in the still may consist of nitric acid of about 33 per cent. strength, to which has been added a considerable excess of urea (more than sufficient to saturate the acid at 15° C.) for the purpose of destroying any nitrous acid which may be formed, and which would lead to the contamination of the product with ethyl nitrite. The nitric acid in the still should not be materially stronger than about 33 per cent on account of the liability of the mixture to froth and fume off. The still is heated up and cold 70 per cent. nitric acid and ethyl alcohol (rectified spirits) containing a small quantity of urea, e. g. 2 gms. per 100 c. c. are separately introduced into the vessel 7. Alternatively a cold previously prepared mixture of these reactants may be fed into the vessel 7. The ethyl nitrate formed, together with some alcohol, water and traces of nitric acid, is distilled off from the still 1. By-products, e. g. acetic acid, are removed through the drain-pipe 8.

If desired, a mixture of two or more lower aliphatic alcohols, e. g. methyl alcohol and ethyl alcohol, may be reacted with nitric acid in this manner; in this case the ester product is a mixture of the nitric esters of the alcohols employed.

It will be seen that by the above process the freshly introduced reactants are not subjected at once to the full temperature of the reaction vessel, but are raised gradually to this temperature, thus allowing time for the reaction to proceed. If the reactants were introduced directly into the still, the alcohol would tend to vaporize before the reaction had taken place. The presence of a large excess of nitric acid in the still also accelerates the reaction and enables a better yield to be obtained than with a batch process.

As many apparently widely different embodiments of this invention may be made without departing from the spirit and scope thereof, it is to be understood that we do not limit ourselves to the specific embodiments thereof except as defined in the appended claims.

I claim:

1. A process for the continuous manufacture of esters in the liquid phase, which comprises circulating a body of liquid reaction mixture upwardly through a heating zone, returning the liquid emerging from the heating zone in a down-flowing stream separated from said heating zone to the base of the heating zone, applying heat to the liquid in said heating zone so as to boil off at least one of the reaction products, and introducing the reactants which are volatile at the reaction temperature into the said down-flowing stream leading to the base of the heating zone.

2. A process as set forth in claim 1, in which the heating zone comprises a number of separate tubular zones through which the reaction mixture flows in parallel streams.

3. A process for the continuous manufacture of nitric esters of the lower aliphatic alcohols, which comprises circulating a body of liquid reaction mixture comprising nitric acid and urea upwardly through a heating zone, returning the liquid emerging from the heating zone in a down-flowing stream separated from said heating zone to the base of the heating zone, applying heat to the liquid in the heating zone so as to boil off the nitric ester formed, and introducing the alcohol into the said down-flowing stream leading to the base of the heating zone.

4. A process for the continuous manufacture of nitric esters of the lower aliphatic alcohols, which comprises circulating a body of liquid reaction mixture comprising nitric acid and urea upwardly through a heating zone, returning the liquid emerging from the heating zone in a down-flowing stream separated from said heating zone to the base of the heating zone, applying heat to the liquid in the heating zone so as to boil off the nitric ester formed, and introducing the alcohol and fresh nitric acid into the said down-flowing stream leading to the base of the heating zone.

5. A process for the manufacture of ethyl nitrate which comprises circulating a body of liquid reaction mixture, comprising nitric acid of strength not materially exceeding 33 per cent. and urea, upwardly through a heating zone, returning the liquid emerging from the heating zone in a down-flowing stream separated from said heating zone to the base of the heating zone, applying heat to the liquid in the heating zone so as to boil off the ethyl nitrate formed, and introducing ethyl alcohol into the said down-flowing stream leading to the base of the heating zone.

FREDERICK ALEXANDER
FERRIER CRAWFORD.